United States Patent
Wong et al.

(10) Patent No.: US 10,262,007 B2
(45) Date of Patent: Apr. 16, 2019

(54) SYSTEMS AND METHODS FOR AUTOMATICALLY PASSING HINTS TO A FILE SYSTEM

(71) Applicant: Oracle International Corporation, Redwood Shores, CA (US)

(72) Inventors: Brian Lee Wong, Midlothian, VA (US); Chunli Zhang, Irvine, CA (US); Gerald Thornbrugh, Castle Rock, CO (US); Siddheshwar Mahesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/602,598

(22) Filed: May 23, 2017

(65) Prior Publication Data
US 2017/0255644 A1 Sep. 7, 2017

Related U.S. Application Data

(63) Continuation of application No. 13/656,509, filed on Oct. 19, 2012, now Pat. No. 9,678,983.

(51) Int. Cl.
*G06F 17/30* (2006.01)
*H04L 29/08* (2006.01)

(52) U.S. Cl.
CPC .... *G06F 17/30203* (2013.01); *H04L 67/1097* (2013.01)

(58) Field of Classification Search
CPC combination set(s) only.
See application file for complete search history.

(56) References Cited

U.S. PATENT DOCUMENTS

| | | | |
|---|---|---|---|
| 7,555,504 B2 | 6/2009 | Bixby et al. | |
| 7,865,485 B2 | 1/2011 | Mullick et al. | |
| 8,178,579 B2* | 5/2012 | Schreiber | C07D 319/06 514/452 |
| 8,180,793 B2 | 5/2012 | Kurichiyath | |
| 8,296,398 B2* | 10/2012 | Lacapra | G06F 17/30206 709/219 |
| 8,484,161 B2* | 7/2013 | Baker | G06F 17/30079 707/639 |
| 9,678,983 B1 | 6/2017 | Wong | |
| 2005/0065986 A1 | 3/2005 | Bixby et al. | |
| 2005/0066095 A1 | 3/2005 | Mullick et al. | |

(Continued)

OTHER PUBLICATIONS

Chen, Huan, Jin Xiong, and Ninghui Sun. "A novel hint-based I/O mechanism for centralized file server of cluster." In Cluster Computing, 2008 IEEE International Conference on, pp. 194-201. IEEE, 2008.*

(Continued)

*Primary Examiner* — Farhan M Syed
(74) *Attorney, Agent, or Firm* — Kilpatrick Townsend & Stockton, LLP

(57) ABSTRACT

Aspects of the present disclosure involve systems and methods for passing optimization information, which may be used to optimize input/output ("I/O") requests, from a database management system to a file system, using various protocols of a network file system. The optimization information provided by the database management system may relate to various aspects of an I/O request that may be optimized.

20 Claims, 3 Drawing Sheets

(56) References Cited

U.S. PATENT DOCUMENTS

| | | | | |
|---|---|---|---|---|
| 2007/0277130 | A1* | 11/2007 | Lavelle | G01R 31/31831 716/107 |
| 2009/0271412 | A1* | 10/2009 | Lacapra | G06F 17/30206 |
| 2010/0241661 | A1 | 9/2010 | Kurichiyath | |
| 2013/0013619 | A1* | 1/2013 | Lacapra | G06F 17/30206 707/747 |
| 2013/0013639 | A1* | 1/2013 | Lacapra | G06F 17/30206 707/770 |
| 2013/0013654 | A1* | 1/2013 | Lacapra | G06F 17/30206 707/822 |
| 2013/0013655 | A1* | 1/2013 | Lacapra | G06F 17/30206 707/827 |
| 2013/0013675 | A1* | 1/2013 | Lacapra | G06F 17/30206 709/203 |
| 2013/0018928 | A1* | 1/2013 | Lacapra | G06F 17/30206 707/822 |
| 2013/0018930 | A1* | 1/2013 | Lacapra | G06F 17/30206 707/827 |
| 2013/0054530 | A1* | 2/2013 | Baker | G06F 17/30079 707/639 |
| 2013/0066830 | A1* | 3/2013 | Lacapra | G06F 17/30206 707/624 |
| 2013/0066931 | A1* | 3/2013 | Lacapra | G06F 17/30206 707/827 |
| 2013/0073747 | A1* | 3/2013 | Klughart | G06F 3/0607 710/5 |

OTHER PUBLICATIONS

Cheriton, David R. "UIO: A Uniform I/O system interface for distributed systems." ACM Transactions on Computer Systems (TOCS) 5, No. 1 (1987): 12-46.*

Cheriton, David R. "UIO: A Uniform I/0 system interface for distributed systems." ACM Transactions on Computer Systems (TOGS) 5, No. 1 (1987): 12-46.

Ding, Xiaoning, et al., "DiskSeen: Exploiting Disk Layout and Access History of Enhance I/0 Prefetch," Apr. 25, 2007, USENIX '07, pp. 1-22.

Thakur, Rajeev, et al., "On Implementing MPI-IO Portably and with High Performance," 1999, ACM, IOPADS '99, pp. 23-32 (10 total pages).

Chen, Huan, "A Novel Hint-Based I/0 Mechanism for Centralized File Server of Cluster," Sep. 29-Oct. 1, 2008, IEEE International Conference on Cluster Computing, pp. 194-201.

Ali, N. "Scalable I/0 forwarding framework for high-performance computing systems," Aug. 31-Sep. 4, 2009, IEEE International Conference on Cluster Computing, pp. 1-10.

U.S. Appl. No. 13/656,509, filed Oct. 19, 2012, Non-Final Office Action dated Dec. 19, 2013, all pages.

U.S. Appl. No. 13/656,509, filed Oct. 19, 2012, Final Office Action dated Mar. 31, 2014, all pages.

U.S. Appl. No. 13/656,509, filed Oct. 19, 2012, Non-Final Office Action dated Oct. 1, 2014, all pages.

U.S. Appl. No. 13/656,509, filed Oct. 19, 2012, Final Office Action dated Apr. 21, 2015, all pages.

U.S. Appl. No. 13/656,509, filed Oct. 19, 2012, Non-Final Office Action dated Nov. 19, 2015, all pages.

U.S. Appl. No. 13/656,509, filed Oct. 19, 2012, Final Office Action dated Apr. 4, 2016, all pages.

U.S. Appl. No. 13/656,509, filed Oct. 19, 2012, Non-Final Office Action dated Sep. 8, 2016, 24 pages.

U.S. Appl. No. 13/656,509, filed Oct. 19, 2012, Notice of Allowance, dated Feb. 10, 2017, 24 pages.

* cited by examiner

SYSTEMS AND METHODS FOR AUTOMATICALLY PASSING HINTS TO A FILE SYSTEM

CROSS-REFERENCES TO RELATED APPLICATIONS

This Continuation Application claims the benefit of U.S. Non-Provisional application Ser. No. 13/656,509, filed Oct. 19, 2012, entitled "SYSTEMS AND METHODS FOR AUTOMATICALLY PASSING HINTS TO A FILE SYSTEM," the entire disclosure of which is incorporated herein by reference for all purposes.

TECHNICAL FIELD

Aspects of the present disclosure relate to file systems, and in particular, the optimization of I/O requests for storage disks in a file system.

BACKGROUND

Common computing architectures store and retrieve data from some medium, such as various forms of semiconductor based memory, storage disks, and tape drives. In large scale computing systems with large memory requirements, storage appliances may be employed that are used to store vast amounts of information. In such larger scale systems and other systems the data is often organized in a database, which is a commonly used mechanism for organizing and accessing the large amounts of stored data. Typically, database systems interact with a vast spectrum of different types of software applications to allow users to search and retrieve specific pieces of data stored within the database. For example, a database may allow users to generate logical expressions known as "queries" that, when executed, read or write data to the memory and/or the storage disk.

Often times the database may be located in a memory or storage disk located remotely from the database management system. Thus, any database queries and information corresponding to the queries must be transferred from the database management system to a device containing the database, such as a storage appliance and corresponding file system. In such networked environments, communication between the database management system and the remote file system may be limited, due to compatibility issues, etc. It is with these concepts in mind, among others, that aspects of the present disclosure were conceived.

BRIEF SUMMARY

One aspect of the present disclosure involves a system for passing optimization information to a file system. The system includes a network file system to decode a network file system request to extract and input/output ("I/O") write request for a file system and an optimization attribute corresponding to the I/O write request. The network file system is further configured to transform the I/O write request and the optimization attribute to a standard format.

Aspects of the present disclosure include methods for passing optimization information. The method includes decoding a network file system request to extract and input/output ("I/O") write request for a file system and an optimization attribute corresponding to the I/O write request. The method further includes transforming the I/O write request and the optimization attribute to a standard format.

Aspects of the present disclosure include non-transitory computer readable mediums encoded with instructions for passing optimization information. The instructions are executable by a processor and include decoding a network file system request to extract and input/output ("I/O") write request for a file system and an optimization attribute corresponding to the I/O write request. The instructions further include transforming the I/O write request and the optimization attribute to a standard format.

BRIEF DESCRIPTION OF THE DRAWINGS

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Figure 1:
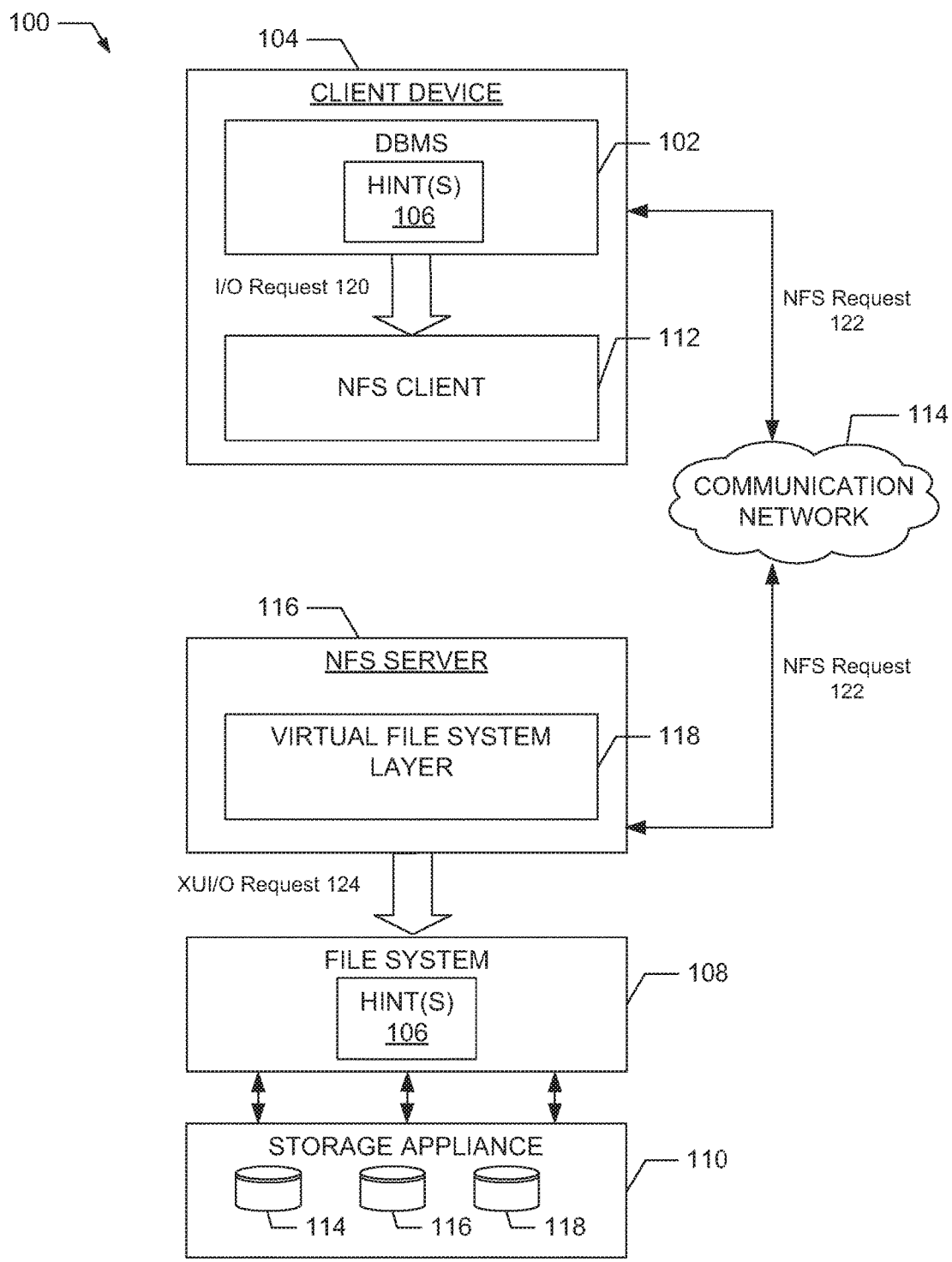
FIG. 1 is an example computing environment for providing hints in accordance with one aspect of the present disclosure.

Aspects of the present disclosure involve systems and methods for passing optimization information/attributes in the form of one or more "hints" from a database management system ("DBMS") to a file system to optimize input/output ("I/O") write requests for the file system, which may be performed on one or more databases of a storage appliance. The optimization attributes provided by the DBMS may relate to various aspects of an I/O request that may be a candidate for optimization, such as I/O type, I/O speed, storage type, cache considerations, file structure type, processing and buffering strategies, and the like.

One particular optimization attribute that may be passed from the DBMS to the file system in the form of a hint is an optimal record size attribute, which describes an optimal file record size for a given database record stored within a database of the storage appliance in which the file system interacts. The optimal file record size hint may be used to ensure the file system is writing data files of an efficient size. Another particular optimization attribute that may be passed from the DBMS to the file system in the form of a hint is a write bias mode attribute, which describes an optimal write mode for the I/O request being performed by the file system, such as indicating whether the I/O request is latency sensitive or throughput sensitive. The optimal write mode hint may identify a specific I/O path that may be used by the file system to perform the I/O write request, in an attempt to increase the efficiency of performing the request.

A network file system may be configured to pass the hints from the DBMS to the file system. Network file systems allow client devices to access data remotely via a communications network. In contrast, typically, a file system is implemented on a local computing device and is only configured to organize and store data within the various memories and/or storages devices of the computing device on which the file system is implemented. Thus, often times unless the DBMS is located within the same computing device as the file system, the DBMS cannot communicate with the file system. Aspects of the present disclosure include defining a mechanism that enables the network file system to extract, interpret, and pass hints from the DBMS to a remotely located file system. In particular, the network file system may validate the hints received from the DBMS, and upon validation, pass the hints to the underlying file system.

Aspects of the present disclosure include defining a standard format that may be used to encode the hints. Specifically, an external data representation ("XDR") may be used to serialize hints passed from the network file system to the file system. Providing hints in a standardized format, such as XDR, allows the hints to be passed from the DBMS to the file system without having to modify the file system and/or DBMS. Once the hints have been encoded, the hints may be passed or otherwise transmitted to the file system using a modified uio mechanism. In particular, an xuio mechanism may be employed to pass hints form the network file system to the file system. Subsequently, the hints may be applied by the file system to optimize performance.

FIG. 1 illustrates a computing environment 100 capable of providing optimization information or optimization attributes from a DBMS 102 to a file system 108 capable of interacting with a storage appliance 110. As illustrated, the DBMS 102 is included within a client device 104, which may include various processing arrangements involving one or more processors, one or more cores, and/or various other computing components that may be used to execute and/or implement the DBMS 102. In particular, the client device 104 may include a communication system to communicate via a wireline and/or wireless communications, such as through the Internet, an intranet, an Ethernet network, a wireline network, a wireless network, a mobile communications network, and/or another communication network, such as communication network 114. In the illustrated environment 100, the client device 104 communicates with a NFS server 116 of a network file system.

The DBMS 102 is a database management system and may include applications, processes, instructions, and/or functions that control the creation, maintenance, and use of a database for a variety of database models, such as a relational model or object model, or the like. More particularly, the DBMS 102 may be configured to access (i.e. read and write) data within the storage appliance 110 via the file system 108, such as within databases 114, 116, and/or 118 by issuing I/O requests.

Additionally, the DBMS 102 may be configured to provide optimization information or optimization attributes in the form of hint(s) 106, in conjunction with an I/O request. More particularly, the DBMS 102 may implement or otherwise provide and interface allowing optimization information/attributes (hints) to be passed along with each I/O request. The hints may be used to optimize the I/O requests issued by the DBMS 102 at the file system 108, effectively increasing performance and efficiency of the databases upon which the I/O requests will be performed, such as the databases 114, 116, or 118 of the storage appliance 110.

The DBMS 102 may various types of hints to the file system 108 for use in optimizing I/O requests. For example the hint(s) 106 may include an optimal record size hint and/or a write-bias hint, as described above. Additionally, the hint(s) 106 may include a "file type" hint, which denotes the file type for the I/O request. For example, the file type hint may indicate that the I/O request is a redo-log-write, or a data file-write, or a control-file-write. The NFS server 112 then maps the particular I/O write to either treat it as latency sensitive or throughput sensitive, depending on the type of the I/O.

The hint(s) 106 may include a "priority" hint that describes the preferred priority for the I/O request. For example, a backup I/O request may be prioritized as a lower priority than a control file I/O request. The hint(s) 106 may include a "caching" hint that indicates to the server whether or not cache the data for the particular I/O request. Other types of hints for optimizing various aspects of an I/O request may also be included.

The DBMS 102 may include functionality to interact with and/or communicate with a network file system implementing a client-server architecture, including a NFS client 112 on the client device 104 and the NFS server 116, collectively referred herein as ("NFS"). The NFS may be a distributed file system that allows the DBMS 102 of the client device 104 to communicate with the file system 108, and in particular, provide an I/O write request 120 and any corresponding hint(s) 106 to the file system 108 over a network, such as the communication network 114. In one particular embodiment, the NFS may be the Oracle® NFS version 4 ("NFSv4"), in which various NFSv4 protocols may be used to facilitate communication of the hint(s) 106 from the DBMS 102 to the NFS server 116.

More particularly, the NFS client 112 may be configured to generate a network file system request ("NFS request") 122 to transmit the hint(s) 106 received from the DBMS 102 to the NFS server 116. Initially, the hint(s) 106 may be encoded in XDR format to ensure portability across different processor architectures, such as when the client device 104 and the NFS server 112 are implemented on or within different processing architectures. For example, each of the hint(s) 106 may be defined within the XDR structure as follows:

```
struct dnfs_cte {
    uint_t    dnfs_cte_length;
    dnfs_cte_data dnfs_cte_data;
};
```

In particular, each hint encoded in XDR may include a "data" field (i.e. dnfs_cte_data) containing the hint and a "length" field (i.e. dnfs_cte_length) indicating the length of the hint at the bit level. For example, the NFS server 116 may receive an arbitrary number of hints in a given NFS request 122 as a received from the NFS client 112. If the NFS request includes a particular hint the NFS server 116 cannot interpret or understand, the NFS server 116 will skip past the hint by applying the hint's corresponding length field to skip to or otherwise identify the next hint.

Additionally, encoding the hint(s) 106 in an XDR format, allows the hint(s) 106 to be forward compatible—an older NFS server will still be capable of extracting hints that may have been received from a newer NFS client with new hint types. Since each hint includes the length field, if and when a client device (e.g. client 104) sends multiple hints to the NFS server 112, some including new hints that the NFS server 116 cannot interpret and some including older hints that the NFS server 116 can interpret, the NFS server 112 may skip past the unknown hints by analyzing its length field.

The XDR encoded hints may be encoded into the NFS request 122. More particularly, the NFS client 112 may include or otherwise implement a compound "tag" that may be used to encode the hint(s) 106 received from the DBMS 102. Stated differently, the hint(s) 106 may be passed using the compound "tag", which is a field in the NFSv4 compound structure (a component of the NFSv4 protocol). For example, in one particular embodiment, the compound field may be defined as:

```
struct COMPOUND4args {
    utf8str_cs    tag;
    uint32_t      minorversion;
    nfs_argop4    argarray< >;
};
```

As indicated above, the compound "tag" field of the compound structure may be a unicode transformation format ("utf") string type (opaque to the server implementation), such as an utf-8 string. Thus, the hint(s) 106 received from the DBMS 102 may be XDR encoded, converted to a character string format (utf), and subsequently encoded into the "tag" field of a compound structure within the NFS request 122.

The NFS server 116 may interface with the file system 108, to provide the I/O write request and any hints included in the NFS request 122 received from the NFS client 112 to the file system 108. In particular, the NFS server 116 may employ a "uio" structure to encapsulate the I/O write requests received from the DBMS 102. A uio structure is a common data structure used to describe data in a data transfer. Additionally, the NFS server 116 may extend or otherwise overload the uio structure of the NFS request 122 to generate an "xuio" request 124, which functions similar to a "uio" request, with the addition that hint(s) 106 are included as metadata in the xuio request 124. The xuio request 124 may be provided to the file system 108 for execution.

The file system 108 may include and/or define applications, processes, instructions, and/or functions that may be used to store, retrieve, update, and/or manage data of the storage appliance 110, such as databases 114, 116, and 118. In particular, the file system 108 may be configured to process the xuio request 124 received from the NFS server 116 to extract the I/O write request and any corresponding hints transmitted from the DBMS 102 and use the hints to process and optimize the I/O write request. In one particular embodiment, the file system 108 may be a ZFS file system designed by Oracle®. The features of ZFS include data integrity verification against data corruption modes, support for high storage capacities, integration of the concepts of file system and volume management, snapshots and copy-on-write clones, continuous integrity checking and automatic repair, RAID-Z and native NFSv4 ACLs, and the like.

Figure 2:
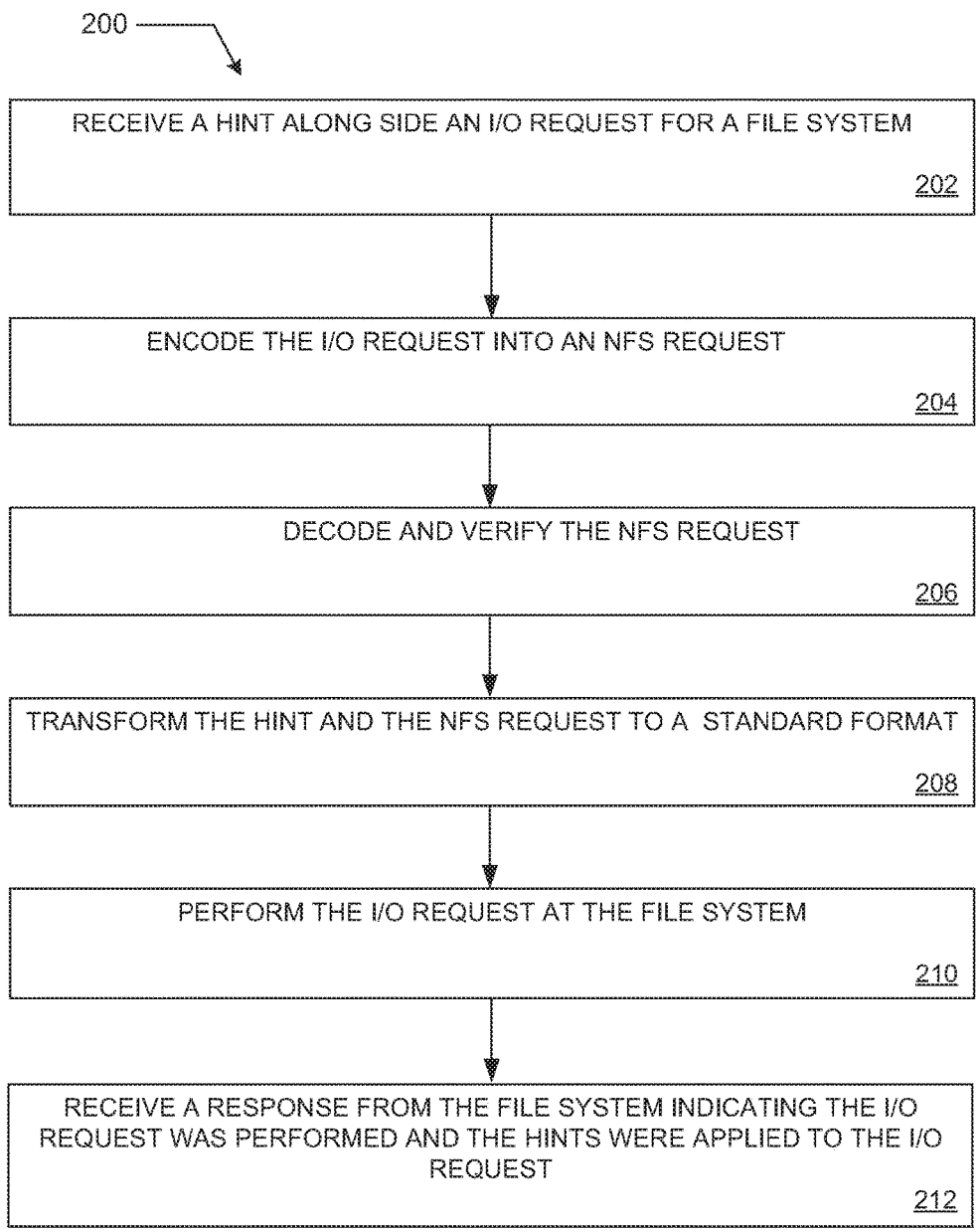
FIG. 2 is an example process for passing hints in accordance with one aspect of the present disclosure.

Referring now to FIGS. 1-2, in one particular embodiment, one or more logical instructions, threads, processes, and/or instructions of the various computing components illustrated in the computing environment 100 may be executed, such as process 200, which depicts an example method for passing hints from the DBMS 102 to the file system 108.

Process 200 begins with receiving one or more hints along side an I/O request for a file system (operation 202). As illustrated in FIG. 1, hint(s) 106 may be received from the DBMS 102 at the NFS client 112 of the NFS. The hint(s) 106 may be received along side or otherwise in conjunction with an I/O request 120 for the file system 108. For example, an I/O request for writing a "re-do" log may be received by the NFS client 112. A re-do log tracks the various changes made to a database in the form of records. Along with the I/O write request for the "re-do" log, a hint indicating that the optimal file record size of the "re-do" log should be 1K may be received by the NFS client 112. The optimal block size hint may be used to increase efficiency of the DBMS 102 and/or file system 108 when accessing databases 114, 116, or 118 of the storage appliance 110. In particular, if the database record size is the same size as the block size written by the file system 108 within the storage appliance 110, only a write operation needs to be performed to update or write the data. However, if the database record size is different than the as the block size written by the file system 108, multiple read and write operations must be performed, which is more expensive and inefficient.

As another example, a hint indicating that the "re-do" log should use a "latency" write bias mode (latency sensitive) may be passed along with the I/O write request for the "re-do" log. Including a write bias hint may also increase the increase efficiency. A write bias hint for the "re-do" log indicates that the file should be written as quickly as possible, or with the least amount of latency, because other requests may be waiting for access to the "re-do" log, and cannot gain such access until other requests have been completed. Thus, providing a write bias hint for access to the re-do log indicating to write to the file quickly will ensure that the request is written quickly, allowing other requests to access the file, thereby increasing the performance of the DBMS 102 and the file system 108. In particular, the write bias mode may identify an optimal I/O path that should be used to perform the "re-do" log write request.

Once the I/O request has been received, the I/O request may be encoded into an NFS request (operation 204). More particularly, the hint(s) 106 received from the DBMS 102 may be XDR encoded, converted to a utf character string and encoded into a compound tag of the NFS request 122. Thus, referring to the "re-do" log example, the 1K optimal record size hint and the latency write bias mode hint may are XDR encoded, converted to a utf-8 string, and encoded into a compound tag of an NFS request and transmitted to the NFS server 116.

Once an NFS request has been received, the NFS request is decoded and verified (operation 206). As illustrated in FIG. 1, the NFS request 122 received by the NFS server 116 may be decoded to extract the compound tag of the request. Subsequently, the tag may be verified to determine that the tag was received from the NFS client 112 of the NFS. Once verified, any hint(s) 106 within the tag may be extracted and XDR decoded. Referring to the "re-do" log example, the NFS request encoding the I/O write request from the "re-do" log may be received by the NFS server 116. Subsequently, the request may be decoded to extract the I/O write request for the re-do log, the 1K optimal block size hint, and the write-bias latency hint.

The decoded I/O request and hints may be processed into a standard format (operation 208). As shown in FIG. 1, the I/O write request 120 extracted from the NFS request 124 may any be transformed into an xuio request 124 by the NFS server 116. Additionally, any hint(s) 106 may be encapsulated as metadata alongside the I/O write request 120 within the xuio request 124. Referring to the "re-do" log example, a xuio request may be generated including both the I/O request to write the "re-do" log and metadata describing the 1K optimal block size hint and the latency write-bias hint extracted from the compound tag of the NFS request. Subsequently, the xuio request may be transmitted from the NFS server 116 to the file system 108.

The file system 108 may perform the I/O write request and apply the hints (operation 210). Referring again to the "re-do" log example, the file system 108 may write "re-do" log data file according to the optimal block size hint and additionally may write the data in accordance with the write-bias latency hint (i.e. using the identified I/O path). Subsequently, a response may be received indicating that the I/O request was performed and the hints were applied (operation 212). In particular, a response from the file system 108 may be received by the NFS server 116 indicating that the file system 108 was able to perform the various hints to the I/O request, thereby optimizing the request.

Figure 3:
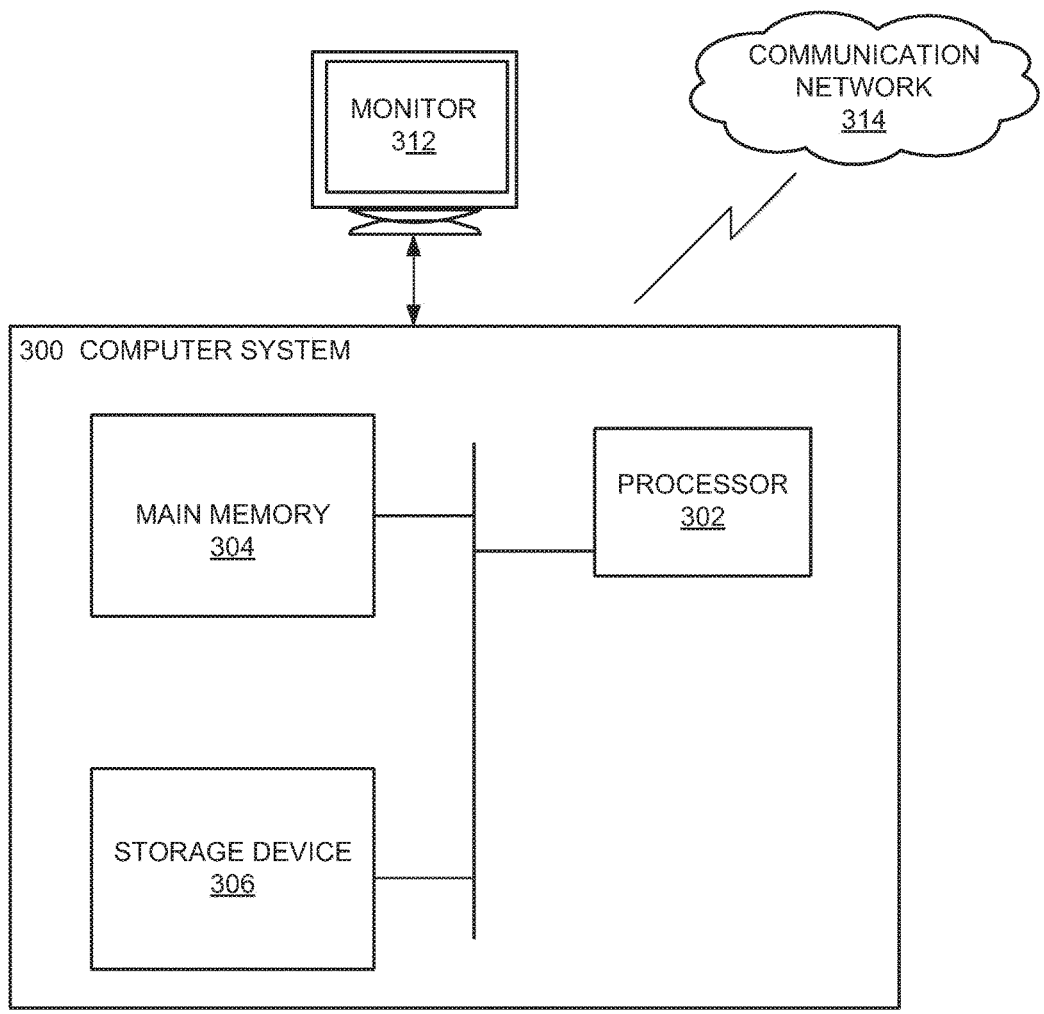
FIG. 3 is an example computing system in accordance with one aspect of the present disclosure.

The various inventive concepts described above may be implemented on virtually any type of computer regardless of the platform being used. For example, as shown in FIG. 3, a computer system 300 includes a processor 302, associated memory 304, a storage device 306, and numerous other elements and functionalities typical of today's computers (not shown). The computer 300 may also include input means, such as a keyboard and a mouse and output means, such as a monitor 312. The computer system 300 may be connected to a local area network (LAN) or a Wide area network (e.g., the Internet), such as communication network 414, via a network interface connection (not shown). Those skilled in the art will appreciate that these input and output means may take other forms.

Further, those skilled in the art will appreciate that one or more elements of the computer system 300 may be located at a remote location and connected to the other elements over a network. The invention may be implemented on a distributed system having a plurality of nodes, where each portion of the invention (e.g., the operating system, file system, cache, application(s), etc.) may be located on a different node within the distributed system, and each node may corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, a digital versatile disk (DVD), or any other suitable tangible computer readable storage device.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A computer-implemented method, comprising:

identifying, at a network file system (NFS), a group of one or more storage appliances associated with a remotely located file system, the NFS being configured to enable a client device to access the remotely located file system, and each storage appliance of the group of one or more storage appliances being configured to store one or more first database files of a first file type;

adding a new storage appliance to the group of one or more storage appliances, the addition causing the new storage appliance to be accessible to the client device, and the new storage appliance being configured to store one or more second database files of a second file type, and the first file type being different from the second file type;

receiving an I/O request, the I/O request being defined by a protocol, the I/O request requesting access to a second database file of the one or more second database files stored in the new storage appliance, the I/O request including an encoded tag corresponding to one or more optimization attributes, each optimization attribute of the one or more optimization attributes being used to optimize processing of the I/O request, and the one or more optimization attributes being associated with the second file type;

extracting the encoded tag included in the I/O request;

decoding the extracted encoded tag;

identifying the one or more optimization attributes based on the decoded tag;

transforming the one or more optimization attributes and the I/O request into a new I/O request, the new I/O request including the I/O request and metadata, and the metadata representing the one or more optimization attributes associated with the I/O request; and transmitting the new I/O request to the remotely located filed system, wherein receiving the new I/O request at the remotely located file system causes the new storage appliance to execute the I/O request according to the one or more optimization attributes, and the I/O request being configured to execute at the remotely located file system without having to modify the NFS to process I/O requests corresponding to the second file type.

2. The computer-implemented method of claim 1, wherein the NFS uses a protocol to communicate I/O requests from the client device to the one or more storage appliances, and wherein adding the new storage appliance to the group associates the new storage appliance with the NFS without modifying the protocol.

3. The computer-implemented method of claim 1, wherein adding the new storage appliance to the group associates the new storage appliance with the NFS without modifying the NFS.

4. The computer-implemented method of claim 1, wherein transforming the one or more optimization attributes and the I/O request further includes:
transforming the I/O request and the one or more optimization attributes from a first format into a second format, the second format including the I/O request and metadata, the metadata representing the one or more optimization attributes associated with the I/O request; and generating the new I/O request including the I/O request and the metadata.

5. The computer-implemented method of claim 1, wherein each storage appliance of the one or more storage appliances is configured to store a database file of a file type.

6. The computer-implemented method of claim 1, wherein when an additional I/O request is received at the new storage appliance, the additional I/O request is executed according to an additional optimization attribute included in the additional I/O request.

7. The computer-implemented method of claim 1, wherein executing the I/O request according to the one or more optimization attributes includes accessing a database file of the one or more database files of the second file type.

8. A system, comprising:
one or more data processors; and
a non-transitory computer-readable storage medium containing instructions which, when executed on the one or more data processors, cause the one or more data processors to perform operations including:
identifying, at a network file system (NFS), a group of one or more storage appliances associated with a remotely located file system, the NFS being configured to enable a client device to access the remotely located file system, and each storage appliance of the group of one or more storage appliances being configured to store one or more first database files of a first file type;
adding a new storage appliance to the group of one or more storage appliances, the addition causing the new storage appliance to be accessible to the client device, and the new storage appliance being configured to store one or more second database files of a second file type, and the first file type being different from the second file type;
receiving an I/O request, the I/O request being defined by a protocol, the I/O request requesting access to a second database file of the one or more second database files stored in the new storage appliance, the I/O request including an encoded tag corresponding to one or more optimization attributes, each optimization attribute of the one or more optimization attributes being used to optimize processing of the I/O request, and the one or more optimization attributes being associated with the second file type;
extracting the encoded tag included in the I/O request;
decoding the extracted encoded tag;
identifying the one or more optimization attributes based on the decoded tag;
transforming the one or more optimization attributes and the I/O request into a new I/O request, the new I/O request including the I/O request and metadata, and the metadata representing the one or more optimization attributes associated with the I/O request; and
transmitting the new I/O request to the remotely located filed system, wherein receiving the new I/O request at the remotely located file system causes the new storage appliance to execute the I/O request according to the one or more optimization attributes, and the I/O request being configured to execute at the remotely located file system without having to modify the NFS to process I/O requests corresponding to the second file type.

9. The system of claim 8, wherein the NFS uses a protocol to communicate I/O requests from the client device to the one or more storage appliances, and wherein adding the new storage appliance to the group associates the new storage appliance with the NFS without modifying the protocol.

10. The system of claim 8, wherein adding the new storage appliance to the group associates the new storage appliance with the NFS without modifying the NFS.

11. The system of claim 8, wherein transforming the one or more optimization attributes and the I/O request further includes:
transforming the I/O request and the one or more optimization attributes from a first format into a second format, the second format including the I/O request and metadata, the metadata representing the one or more optimization attributes associated with the I/O request; and
generating the new I/O request including the I/O request and the metadata.

12. The system of claim 8, wherein each storage appliance of the one or more storage appliances is configured to store a database file of a file type.

13. The system of claim 8, wherein when an additional I/O request is received at the new storage appliance, the additional I/O request is executed according to an additional optimization attribute included in the additional I/O request.

14. The system of claim 8, wherein executing the I/O request according to the one or more optimization attributes includes accessing a database file of the one or more database files of the second file type.

15. A computer-program product tangibly embodied in a non-transitory machine-readable storage medium, including instructions configured to cause a data processing apparatus to perform operations including:
identifying, at a network file system (NFS), a group of one or more storage appliances associated with a remotely located file system, the NFS being configured to enable a client device to access the remotely located file system, and each storage appliance of the group of one or more storage appliances being configured to store one or more first database files of a first file type;
adding a new storage appliance to the group of one or more storage appliances, the addition causing the new storage appliance to be accessible to the client device, and the new storage appliance being configured to store one or more second database files of a second file type, and the first file type being different from the second file type;

receiving an I/O request, the I/O request being defined by a protocol, the I/O request requesting access to a second database file of the one or more second database files stored in the new storage appliance, the I/O request including an encoded tag corresponding to one or more optimization attributes, each optimization attribute of the one or more optimization attributes being used to optimize processing of the I/O request, and the one or more optimization attributes being associated with the second file type;

extracting the encoded tag included in the I/O request;

decoding the extracted encoded tag;

identifying the one or more optimization attributes based on the decoded tag;

transforming the one or more optimization attributes and the I/O request into a new I/O request, the new I/O request including the I/O request and metadata, and the metadata representing the one or more optimization attributes associated with the I/O request; and transmitting the new I/O request to the remotely located filed system, wherein receiving the new I/O request at the remotely located file system causes the new storage appliance to execute the I/O request according to the one or more optimization attributes, and the I/O request being configured to execute at the remotely located file system without having to modify the NFS to process I/O requests corresponding to the second file type.

16. The computer-program product of claim 15, wherein the NFS uses a protocol to communicate I/O requests from the client device to the one or more storage appliances, and wherein adding the new storage appliance to the group associates the new storage appliance with the NFS without modifying the protocol.

17. The computer-program product of claim 15, wherein adding the new storage appliance to the group associates the new storage appliance with the NFS without modifying the NFS.

18. The computer-program product of claim 15, wherein transforming the one or more optimization attributes and the I/O request further includes:

transforming the I/O request and the one or more optimization attributes from a first format into a second format, the second format including the I/O request and metadata, the metadata representing the one or more optimization attributes associated with the I/O request; and generating the new I/O request including the I/O request and the metadata.

19. The computer-program product of claim 15, wherein each storage appliance of the one or more storage appliances is configured to store a database file of a file type.

20. The computer-program product of claim 15, wherein when an additional I/O request is received at the new storage appliance, the additional I/O request is executed according to an additional optimization attribute included in the additional I/O request.

* * * * *